Jan. 19, 1932. G. DALMACE ET AL 1,841,791
HYDRAULIC STABILIZER FOR MOTOR VEHICLES
Filed March 6, 1930 3 Sheets-Sheet 1
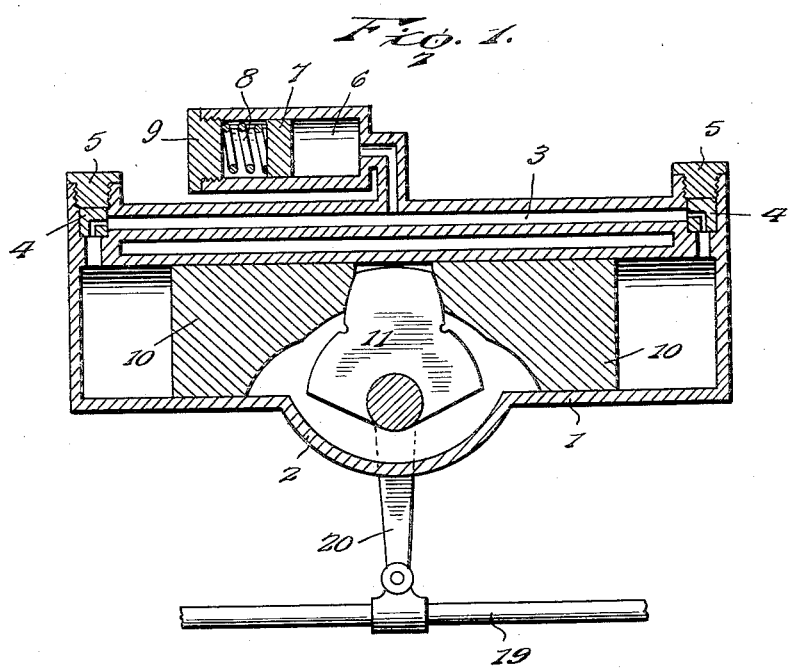
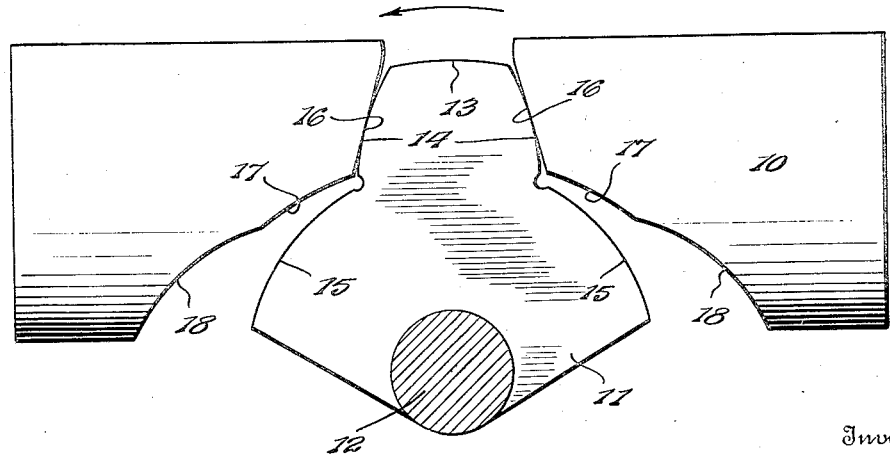
Inventors
Georges Dalmace.
Leon Jacquet.

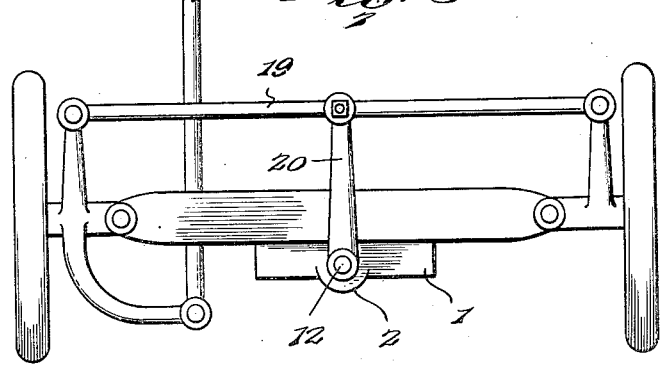
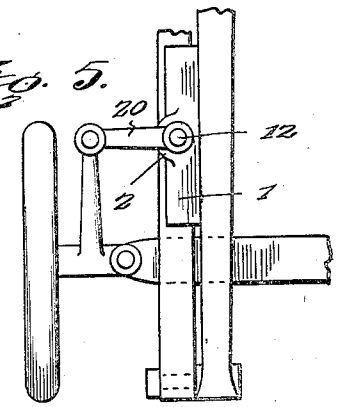
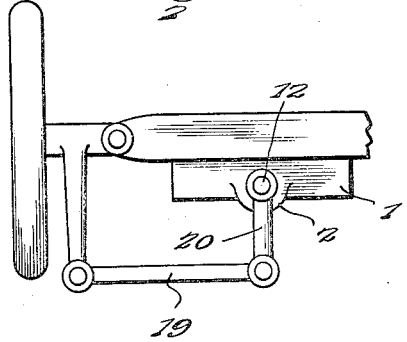
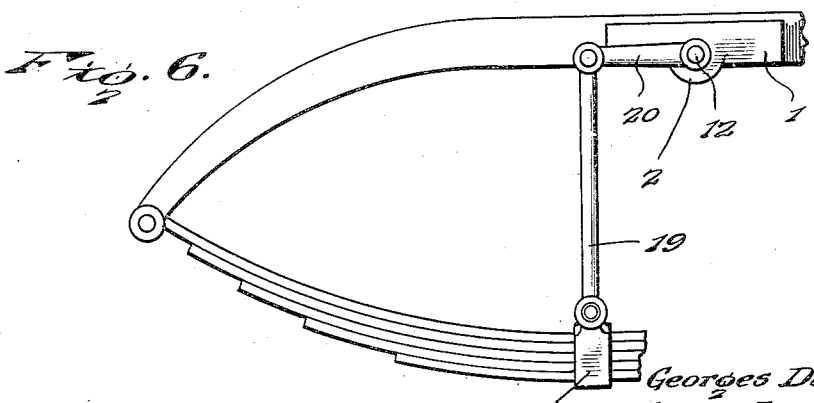

Jan. 19, 1932.    G. DALMACE ET AL    1,841,791
HYDRAULIC STABILIZER FOR MOTOR VEHICLES
Filed March 6, 1930    3 Sheets-Sheet 3
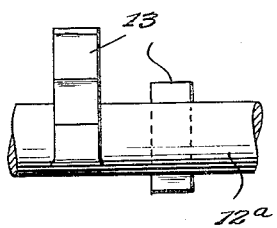
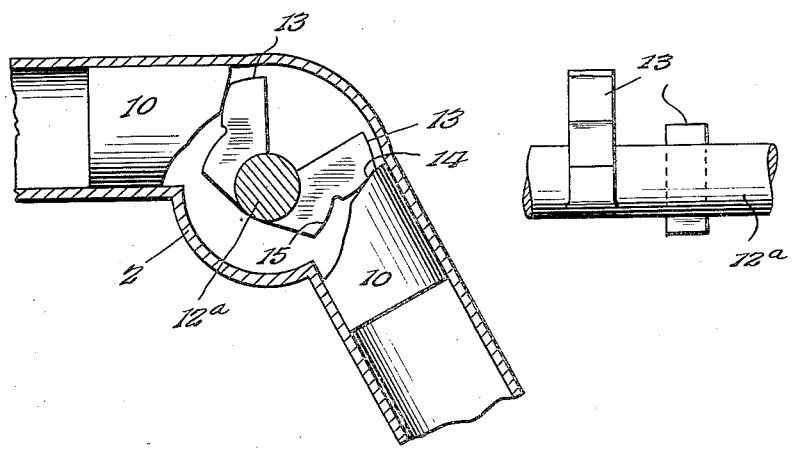
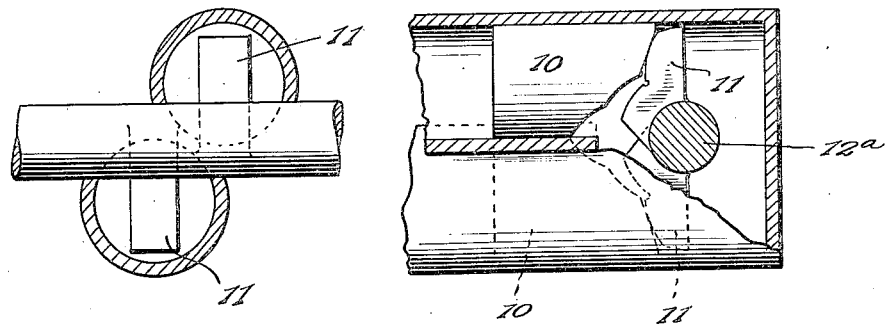
Inventors
Georges Dalmace.
Leon Jacquet.
By Lacey & Lacey,
Attorneys Patented Jan. 19, 1932

1,841,791

UNITED STATES PATENT OFFICE

GEORGES DALMACE, OF LEVALLOIS-PERRET, AND LÉON JACQUET, OF ARGENTEUIL, FRANCE

HYDRAULIC STABILIZER FOR MOTOR VEHICLES

Application filed March 6, 1930, Serial No. 433,779, and in France March 9, 1929.

The invention provides means for minimizing vibration, shock and play in the moving parts of motor vehicles, whereby to reduce wear and render riding more comfortable.

The invention contemplates a mechanism including a cylinder, pistons therein, a cam between the pistons, liquid in the cylinder, a passageway between the ends of the cylinder, means for regulating flow of the liquid from one end of the cylinder to the other through the passageway, and an expansion chamber connected with the passageway to compensate for any recoil and variations in the volume of liquid contained in the system.

For a full understanding of the invention and the merits thereof, reference is to be had to the following description and the drawings hereto attached, in which:

Figure 1 is a sectional view of a stabilizer embodying the invention.

Figure 2 is an enlarged detail view of the cam and opposing end portions of the two pistons coacting therewith.

Figure 3 is a detail view showing the application of the invention to the steering wheels of a motor vehicle.

Figure 4 is a detail view showing a different application of the invention to one of the steering wheels of a motor vehicle.

Figure 5 is a view similar to Figure 4, illustrating the invention differently applied.

Figure 6 illustrates the invention applied to a vehicle spring for controlling the movement thereof.

Figure 7 is a sectional view of a modification.

Figure 7a shows the form of cam embodied in the device depicted in Figure 7.

Figure 8 is a modification having parallel cylinders.

Figure 8a is a longitudinal sectional view of the form shown in Figure 8.

The numeral 1 designates the cylinder which is closed at opposite ends and is formed intermediate its ends with an enlarged portion 2. A passageway 3 connects opposite ends of the cylinder 1 and may be provided in any determinate manner. The flow of liquid through the passageway 3 from one end of the cylinder to the other may be controlled in any preferred way. In one form of controlling means, blocks 4 are interposed in the length of the passageway 3 and are removable to be replaced by other blocks having openings therein of different sizes so that blocks having openings of required size may be positioned within the passageway 3 to regulate the flow of liquid therethrough. The blocks 4 are removable through openings which are normally closed by means of plugs 5. An expansion chamber 6 is connected with the passageway 3 and a plunger 7 has a piston fit therein and is urged forwardly by means of a spring 8. Access is had to the chamber 6 through an opening which is normally closed by means of a plug 9.

Two pistons 10 are located within the cylinder 1 and are disposed upon opposite sides of the central enlargement 2 with a cam 11 between their opposing ends. The cam 11 is fast to a pivot 12 which usually consists of a shaft. The cam includes an end portion 13 and side portions 14 and 15. The active portions 13, 14 and 15 of the cam 11 constitute parts of circles, the portions 13 and 15 being struck from circles of different diameters having a center coinciding with the axis of the pivot 12. The end of each of the pistons 10 facing the cam 11 is formed with three active portions 16, 17 and 18. The portions 16 are straight whereas the portions 17 and 18 are curved and coincide with the respective portions 13 and 15 of the cam.

When the parts of the stabilizer are in active position, the inner ends of the pistons 10 are in contact with opposite sides of the cam, the curved portions 14 of the cam being in contact with the straight portions 16 of the piston. When the cam 11 is rotated in either direction, the portion 14 bears against the portion 16 of the piston adjacent the advancing side of the cam, thereby moving the piston. The liquid in the end of the cylinder containing the advancing piston is displaced and flowing through the passageway 3 enters the opposite end of the cylinder and causes the piston therein to follow the receding side of the cam. The movement of the cam and pistons is controlled by the flow of the liquid through the passageway 3.

When the portion 14 of the cam clears the portion 16 of the piston, the end portion 13 of the cam engages and rides upon the portion 17 of the piston at the advancing side of the cam and, at the same time, the portion 18 of the following piston and the portion 15 of the cam, on the receding side of the latter, come into engagement with the result that the cam may continue to move in the same direction without imparting any further movement to either one of the pistons the surfaces 13 and 17 having the same curvature and the surfaces 15 and 18 also having the same curvature. This operation takes place during the movement of the cam in either direction and on the return of the cam to normal position, which is that indicated in Figures 1 and 2, the reverse of the movement takes place.

When the invention is installed, the cylinder 1 is secured to a fixed part whereas the cam is connected to the movable part by means of a rod 19 and arm 20, the latter being attached to the pivot 12 to turn therewith. In the arrangement shown in Figure 3 of the drawings, the cylinder is attached to the front axle of a motor vehicle and the rod 19 connects the arms of the steering knuckles. In the application shown in Figure 4, each steering wheel has a stabilizer associated therewith, the cylinder being attached to an end portion of the axle and the rod 19 connected to the steering arm of the adjacent steering wheel. As indicated in Figure 5 of the drawings, the stabilizer is mounted upon a side bar of the chassis and the arm 20 is pivoted directly to the steering arm of the adjacent steering wheel.

The expansion chamber 6 provides a reserve supply of liquid or fluid to compensate for slight losses which may be occasioned by possible irregular or spasmodic operation. It also serves as a safety valve or shock absorber to neutralize the sudden increased strain resulting from a sharp turn to avoid collision or impact against some unobserved object.

Figure 6 shows the invention applied to a vehicle spring, the rod 19 being connected to the spring by means of a shackle 21 and the cylinder being attached to the adjacent side bar of the chassis.

In the modifications shown in Figures 7 and 8, the cam consists of two similar or like parts carried by a shaft 12a which corresponds to the pivot 12. As indicated in Figure 7, the cylinder comprises two parts, which are angularly disposed, and in each of which a piston 10 is mounted, each of the pistons coacting with a part of the cam in substantially the manner hereinbefore indicated. Figure 8 shows an arrangement in which the cylinder comprises two parts disposed in parallel relation, each of the parts containing a piston with which a part of the cam cooperates in substantially the same manner as Figure 7.

What is claimed is:

1. A stabilizer comprising a cylinder having opposite end portions connected by means of a passageway, a cam within the cylinder intermediate the ends thereof, and independent imperforate pistons in end portions of the cylinder with the cam between the opposed inner ends thereof, said cam having curved surfaces at different distances from its center and the pistons having like curved surfaces on their inner ends to be engaged by the curved surfaces on the cam whereby, during the initial movement of the cam, both pistons move and during a continued movement of the cam in the same direction, both pistons remain stationary.

2. A stabilizer comprising a cylinder having opposite end portions connected by means of a passageway, a cam within the cylinder intermediate the ends thereof, and independent pistons in end portions of the cylinder with the cam therebetween, said cam having an intermediate portion and similar side portions formed on arcs of circles of different diameters.

3. A stabilizer comprising a cylinder having opposite end portions connected by means of a passageway, a cam within the cylinder intermediate the ends thereof, and independent pistons in end portions of the cylinder with the cam therebetween, each of the pistons having a straight portion and curved portions adapted to coact with intermediate and side portions of the cam.

4. A stabilizer comprising a cylinder having opposite end portions connected by means of a passageway, a cam within the cylinder intermediate the ends thereof, and independent pistons in end portions of the cylinder with the cam therebetween, and an expansion chamber connected with the passageway, and containing a spring actuated plunger.

5. A stabilizer comprising a cylinder having opposite end portions connected by means of a passageway, a symmetrical cam within the cylinder intermediate the ends thereof, and independent imperforate pistons in end portions of the cylinder with the cam between their opposed ends, the cam having an outer projecting portion provided with an arcuate extremity concentric with its pivot and similar inner side portions having arcuate edges concentric with its pivot but of less radius than said arcuate extremity and the pistons having plane and arcuate portions on their opposed ends to coact with the projecting portion and arcuate surfaces of the cam.

In testimony whereof we affix our signatures.

GEORGES DALMACE. [L. S.]
LÉON JACQUET. [L. S.]